United States Patent
Sakai et al.

(10) Patent No.: US 9,085,668 B2
(45) Date of Patent: Jul. 21, 2015

(54) IMPREGNATED CALCIUM CARBONATE, METHOD FOR PRODUCING SAME, POLYMER COMPOSITION, AND POLYMER PRECURSOR COMPOSITION

(75) Inventors: Yu Sakai, Amagasaki (JP); Yoshisada Kayano, Amagasaki (JP); Kanehiro Osakabe, Amagasaki (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 0 days.

(21) Appl. No.: 14/126,144

(22) PCT Filed: Jun. 12, 2012

(86) PCT No.: PCT/JP2012/065009
§ 371 (c)(1),
(2), (4) Date: Dec. 13, 2013

(87) PCT Pub. No.: WO2012/173114
PCT Pub. Date: Dec. 20, 2012

(65) Prior Publication Data
US 2014/0128529 A1 May 8, 2014

(30) Foreign Application Priority Data
Jun. 13, 2011 (JP) .................................. 2011-131113

(51) Int. Cl.
*C08K 3/26* (2006.01)
*A61L 2/08* (2006.01)
(Continued)

(52) U.S. Cl.
CPC . *C08K 9/04* (2013.01); *B82Y 30/00* (2013.01); *C09C 1/021* (2013.01); *C01P 2004/62* (2013.01);
(Continued)

(58) Field of Classification Search
CPC .................................. C08K 9/04; C09C 1/021
USPC ............ 524/425, 569, 394; 106/465; 264/128
See application file for complete search history.

(56) References Cited

U.S. PATENT DOCUMENTS

| | | | |
|---|---|---|---|
| 5,135,967 A | * | 8/1992 | Aumann et al. ............... 523/210 |
| 2002/0102404 A1 | | 8/2002 | Nakai et al. |
| 2007/0258877 A1 | | 11/2007 | Nover et al. |

FOREIGN PATENT DOCUMENTS

| CN | 1807519 A | 7/2006 |
|---|---|---|
| CN | 1910226 A | 2/2007 |

(Continued)

OTHER PUBLICATIONS

Notification of Transmittal of Copies of Translation of the International Preliminary Report on Patentability (Form PCT/IB/338) of International Application No. PCT/JP2012/065009 mailed Jan. 3, 2014 with Forms PCT/IB/373 and PCT/ISA/237.

(Continued)

*Primary Examiner* — William Cheung
(74) *Attorney, Agent, or Firm* — Westerman, Hattori, Daniels & Adrian, LLP

(57) ABSTRACT

Provided are an impregnated calcium carbonate that hardly flies but has excellent dispersibility in a polymer composition, a method for producing the impregnated calcium carbonate, and a polymer composition including the impregnated calcium carbonate. The impregnated calcium carbonate is obtained by surface treating calcium carbonate with at least one of a fatty acid, a resin acid, and derivatives of them to yield a surface treated calcium carbonate and impregnating the surface treated calcium carbonate with an organic compound in a liquid state at a normal temperature in an amount of 3 to 22 parts by weight with respect to 100 parts by weight of the surface treated calcium carbonate.

8 Claims, 4 Drawing Sheets

(51) Int. Cl.
  *C08K 5/04* (2006.01)
  *C09C 1/02* (2006.01)
  *D04H 1/64* (2012.01)
  *C08K 9/04* (2006.01)
  *B82Y 30/00* (2011.01)
  *C08K 5/00* (2006.01)
  *C08K 5/09* (2006.01)
  *C08L 71/02* (2006.01)

(52) U.S. Cl.
  CPC ......... *C01P 2004/64* (2013.01); *C01P 2006/12* (2013.01); *C08K 3/26* (2013.01); *C08K 5/0016* (2013.01); *C08K 5/09* (2013.01); *C08L 71/02* (2013.01)

(56) References Cited

FOREIGN PATENT DOCUMENTS

| | | |
|---|---|---|
| EP | 1557442 A1 | 7/2005 |
| EP | 1785452 A1 | 5/2007 |
| EP | 2080783 A1 | 7/2009 |
| EP | 2412673 A1 | 2/2012 |
| JP | 04-031318 A | 2/1992 |
| JP | 2001-072890 A | 3/2001 |
| JP | 2002-235015 A | 8/2002 |
| JP | 2007-520599 A | 7/2007 |
| JP | 2010-228976 A | 10/2010 |

OTHER PUBLICATIONS

International Search Report for PT/JP2012/065009, Mailing Date of Aug. 21, 2012.

Chinese Office Action dated Jul. 29, 2014, issued in corresponding Chinese Patent Application No. 201280028883.6 with English translation (20 pages).

Chinese Office Action dated Mar. 17, 2015, iuused in corresponding CN Patent Application No. 201280028883.6 with English partial translation (14 pages).

Extended European Search Report dated Jan. 30, 2015, issued in European Application No. 12799794.8. (6 pages).

* cited by examiner ical Field

The present invention relates to an impregnated calcium carbonate, a method for producing the impregnated calcium carbonate, a polymer composition including the impregnated calcium carbonate, and a polymer precursor composition including the impregnated calcium carbonate.

BACKGROUND ART

In order to impart various properties to a polymer composition such as a resin and a rubber, calcium carbonate has been added to such a polymer. When calcium carbonate is added in order to improve the properties such as the strength of a polymer composition, a fine calcium carbonate, for example, having a BET specific surface area of about 10 to 40 m$^2$/g may be used.

For example, Patent Document 1 discloses adding a calcium carbonate that is surface treated with a fatty acid salt and has a BET specific surface area of 10 m$^2$/g or more to a resin or the like.

However, a calcium carbonate having a smaller particle size easily flies and thus is difficult to be handled. A calcium carbonate surface treated with, for example, a fatty acid also has a problem of easily flying.

CITATION LIST

Patent Literature

Patent Document 1: JP-A No. 2010-228976

SUMMARY OF INVENTION

Technical Problem

The present invention has a main object to provide an impregnated calcium carbonate that hardly flies but has excellent dispersibility in a polymer composition, a method for producing the impregnated calcium carbonate, a polymer composition including the impregnated calcium carbonate, and a polymer precursor composition including the impregnated calcium carbonate.

Solution to Problem

An impregnated calcium carbonate of the present invention is obtained by surface treating calcium carbonate with at least one of a fatty acid, a resin acid, and derivatives of them to yield a surface treated calcium carbonate and impregnating the surface treated calcium carbonate with an organic compound in a liquid state at a normal temperature. The impregnation amount of the organic compound in a liquid state at a normal temperature is 3 to 22 parts by weight with respect to 100 parts by weight of the surface treated calcium carbonate.

The impregnated calcium carbonate of the present invention is obtained by the impregnation with an organic compound in a liquid state at a normal temperature in an amount of 3 parts by weight or more with respect to 100 parts by weight of the surface treated calcium carbonate and thus hardly flies. Hence, the impregnated calcium carbonate of the present invention is easily handled. In addition, the impregnated calcium carbonate of the present invention is obtained by the impregnation with an organic compound in a liquid state at a normal temperature in an amount of 3 parts by weight to 22 parts by weight with respect to 100 parts by weight of the surface treated calcium carbonate and thus is readily, uniformly dispersed in a polymer or the like when mixed with the polymer.

In the present invention, "impregnating" means infiltrating an organic compound in a liquid state at a normal temperature between the particles of a surface treated calcium carbonate.

In the present invention, it is preferable that the organic compound in a liquid state at a normal temperature be at least one of plasticizers, oil solutions, and polypropylene glycols.

In the present invention, the oil solution can be exemplified by a mineral oil, a synthetic oil, and a vegetable oil.

In the present invention, it is preferable that the calcium carbonate be a synthetic calcium carbonate.

In the present invention, it is preferable that the surface treated calcium carbonate have an average particle size of 20 nm to 200 nm.

In the present invention, it is preferable that the surface treated calcium carbonate have a BET specific surface area of 10 m$^2$/g to 100 m$^2$/g.

In the present invention, it is preferable that the calcium carbonate be treated with the at least one of a fatty acid, a resin acid, and derivatives of them in an amount of 2 parts by weight to 15 parts by weight with respect to 100 parts by weight of the calcium carbonate.

A polymer composition of the present invention includes a polymer and the impregnated calcium carbonate. In the polymer composition of the present invention, the impregnated calcium carbonate is uniformly dispersed in the polymer composition. Hence, the polymer composition of the present invention can be suitably used in various applications.

A polymer precursor composition of the present invention includes a polymer precursor and the impregnated calcium carbonate. In the polymer precursor composition of the present invention, the impregnated calcium carbonate is uniformly dispersed in the polymer precursor composition. Hence, the polymer precursor composition of the present invention can be suitably used in various applications.

A method for producing an impregnated calcium carbonate of the present invention includes: surface treating calcium carbonate with at least one of a fatty acid, a resin acid, and derivatives of them to yield a surface treated calcium carbonate; and impregnating the surface treated calcium carbonate with an organic compound in a liquid state at a normal temperature in an amount of 3 to 22 parts by weight with respect to 100 parts by weight of the surface treated calcium carbonate.

Advantageous Effects of Invention

The present invention can provide an impregnated calcium carbonate that hardly flies and has excellent dispersibility in a polymer composition and a polymer precursor composition. The present invention can further provide a polymer composition and a polymer precursor composition that uniformly disperse the impregnated calcium carbonate.

DESCRIPTION OF EMBODIMENTS

Figure 1:
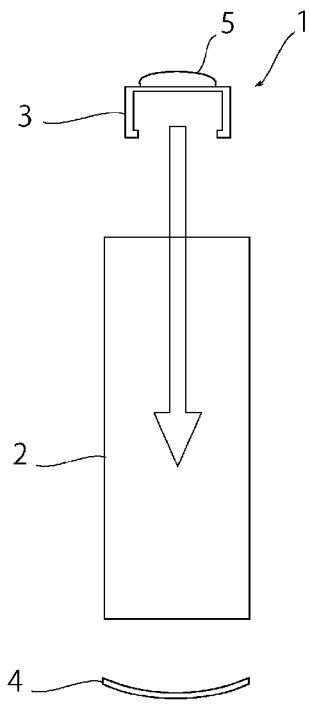
FIG. 1 is a schematic view of a powder tester used for a dustability evaluation in Examples 1 to 4 and Comparative Examples 1 to 3.

A preferred embodiment carrying out the present invention will be described hereinbelow. However, the embodiment below is merely an example. The present invention is not intended to be limited to the embodiment below.

In the present embodiment, an impregnated calcium carbonate is obtained by surface treating calcium carbonate with at least one of a fatty acid, a resin acid, and derivatives of them to yield a surface treated calcium carbonate and impregnating the surface treated calcium carbonate with an organic compound in a liquid state at a normal temperature.

(Calcium Carbonate)

The impregnated calcium carbonate may be composed of any calcium carbonate. For example, a conventionally known calcium carbonate can be used. Specific examples of the calcium carbonate include a synthetic calcium carbonate and a natural calcium carbonate (heavy calcium carbonate). The calcium carbonate is preferably a synthetic calcium carbonate.

The synthetic calcium carbonate is not particularly limited. Examples of the synthetic calcium carbonate include precipitated (colloidal) calcium carbonate and light calcium carbonate. The synthetic calcium carbonate can be produced by, for example, reacting calcium hydroxide with carbon dioxide gas. The calcium hydroxide can be produced by, for example, reacting calcium oxide with water. The calcium oxide can be produced by, for example, burning raw limestone together with coke or the like. In this case, the burning generates carbon dioxide gas, which can be reacted with calcium hydroxide to afford the calcium carbonate.

The natural calcium carbonate is obtained by pulverizing naturally-derived raw calcium carbonate by a known method. Examples of the method for pulverizing the raw calcium carbonate include a pulverizing method with an apparatus such as a roller mill, a high-speed rotation mill (impact shearing mill), a container-driving medium mill (ball mill), a medium stirring mill, a planetary ball mill, and a jet mill.

The calcium carbonate typically has an average particle size of about 20 nm to 200 nm, preferably 20 nm to 150 nm, and more preferably about 30 nm to 100 nm. The average particle size of calcium carbonate is determined by image analysis under a transmission electron microscope.

(Fatty Acid, Resin Acid, and Derivatives of Them)

The fatty acid and derivatives of the fatty acid are not particularly limited. Examples of the fatty acid and derivatives of the fatty acid include fatty acids, metal salts of them, and esters of them.

Examples of the fatty acid include saturated and unsaturated fatty acids having 6 to 31 carbon atoms.

Specific examples of the saturated fatty acid include caproic acid, caprylic acid, pelargonic acid, capric acid, undecanoic acid, lauric acid, myristic acid, palmitic acid, stearic acid, arachidic acid, behenic acid, lignoceric acid, cerotic acid, montanoic acid, and melissic acid. Among them, palmitic acid, stearic acid, and lauric acid are preferably used.

Specific examples of the unsaturated fatty acid include obtusilic acid, caproleic acid, undecylenic acid, linderic acid, tsuzuic acid, physeteric acid, myristoleic acid, palmitoleic acid, petroselinic acid, oleic acid, elaidic acid, ascrebic acid, vaccenic acid, gadoleic acid, gondoic acid, cetoleic acid, erucic acid, brassidic acid, selacholeic acid, ximenic acid, lumequeic acid, sorbic acid, and linoleic acid.

Specific examples of the metal salt of a fatty acid include alkali metal salts of the fatty acid, such as a sodium salt and a potassium salt, and alkaline earth metal salts of the fatty acid, such as a magnesium salt and a calcium salt. Among them, alkali metal salts of the fatty acid, such as a sodium salt and a potassium salt are preferred.

Specific examples of the ester of a fatty acid include stearyl stearate, lauryl stearate, stearyl palmitate, and lauryl palmitate.

More preferred examples of the fatty acid and derivatives of the fatty acid include sodium salts and potassium salts of saturated fatty acids having 9 to 21 carbon atoms. Among them, sodium palmitate, sodium stearate, and sodium laurate are particularly preferred.

The resin acid and derivatives of the resin acid are not particularly limited. Examples of the resin acid and derivatives of the resin acid include resin acids, metal salts of them, and other derivatives of them.

Specific examples of the resin acid include abietic acid, pimaric acid, levopimaric acid, neoabietic acid, palustric acid, dehydroabietic acid, dihydroabietic acid, tetraabietic acid, dextropimaric acid, and isodextropimaric acid.

Specific examples of the metal salt of a resin acid include alkali metal salts of the resin acid, such as a sodium salt and a potassium salt and alkaline earth metal salts of the resin acid, such as a magnesium salt and a calcium salt.

Specific examples of the derivative of a resin acid include hydrogenated rosin, disproportionated rosin, polymerized rosin, rosin ester, maleated rosin, maleated rosin ester, and rosin-modified phenol.

Preferred examples of the resin acid and derivatives of the resin acid include abietic acid, neoabietic acid, dehydroabietic acid, tetraabietic acid, pimaric acid, dextropimaric acid, hydrogenated rosin, disproportionated rosin, and maleated rosin.

The calcium carbonate is treated with the at least one of a fatty acid, a resin acid, and derivatives of them typically in an amount of about 2 parts by weight to 15 parts by weight, preferably about 2 parts by weight to 10 parts by weight, and more preferably about 2.5 parts by weight to 5 parts by weight, with respect to 100 parts by weight of the calcium carbonate. An excessively small treatment amount of the at least one of a fatty acid, a resin acid, and derivatives of them with respect to the calcium carbonate is not preferred because the surface treated calcium carbonate readily aggregates. An excessively large treatment amount of the at least one of a fatty acid, a resin acid, and derivatives of them is not preferred because such treatment fails to achieve the effect in proportion to the surface treatment amount, increases the cost, and is economically disadvantageous.

The at least one of a fatty acid, a resin acid, and derivatives of them adheres to the surface of calcium carbonate in an amount of about 80 to 99% by weight of the treatment amount. In other words, the at least one of a fatty acid, a resin acid, and derivatives of them typically adheres in an amount of about 1.6 parts by weight to 14.9 parts by weight, preferably about 1.6 parts by weight to 9.9 parts by weight, and more preferably about 2.0 parts by weight to 4.9 parts by weight, with respect to 100 parts by weight of calcium carbonate.

(Organic Compound in Liquid State at Normal Temperature)

The organic compound in a liquid state at a normal temperature is not particularly limited. Here, the liquid state at a normal temperature means a liquid state at 1 atmosphere and 25° C.

The organic compound in a liquid state at a normal temperature typically has an average molecular weight of about 30 to 6,000 g/mol. The organic compound in a liquid state at a normal temperature preferably has a viscosity of about 5 mPa·s/20° C. to 3,500 mPa·s/20° C.

Examples of the organic compound in a liquid state at a normal temperature include plasticizers, oil solutions, and polypropylene glycols.

The plasticizer is not particularly limited. Examples of the plasticizer include known plasticizers to be added to a polymer composition such as a resin or a rubber. The plasticizer is preferably a phthalic acid plasticizer, a polyester plasticizer, a sulfonic acid plasticizer, and a phosphoric acid plasticizer. Specific examples of the phthalic acid plasticizer include di-2-ethylhexyl phthalate (DOP), dimethyl phthalate (DMP), diisononyl phthalate (DINP), dibutyl phthalate (DBP), and diisodecyl phthalate (DIDP). Specific examples of the polyester plasticizer include polypropyl adipate and polypropyl sebacate. Specific examples of the sulfonic acid plasticizer include butylbenzenesulfonamide. Specific examples of the phosphoric acid plasticizer include tricresyl phosphate, trioctyl phosphate, and triphenyl phosphate.

Examples of the oil solution include a mineral oil, a synthetic oil, and a vegetable oil.

The mineral oil is a heavy oil obtained during the production process of crude oil. The mineral oil is not particularly limited. The mineral oil preferably has a viscosity of about 5 mPa·s/20° C. to 3,500 mPa·s/20° C. and more preferably about 10 mPa·s/20° C. to 1,000 mPa·s/20° C.

The mineral oil is preferably at least one selected from the group consisting of a paraffin mineral oil, a naphthene mineral oil, and an aromatic mineral oil, more preferably a paraffin mineral oil or a naphthene mineral oil, and even more preferably a naphthene mineral oil.

Examples of the paraffin mineral oil include an oil used as a process oil. Specific examples of the paraffin mineral oil include Diana Process Oils PW-32, PW-90, PW-380, PS-32, PS-90, and PS-430 (trade name) manufactured by Idemitsu Kosan Co., Ltd.

Examples of the naphthene mineral oil include an oil used as a process oil. Specific examples of the naphthene mineral oil include Diana Process Oils NS-24, NS-100, NR-68, NM-26, NM-280, and NP-24 manufactured by Idemitsu Kosan Co., Ltd.

Examples of the aromatic mineral oil include an oil used as a process oil. Specific examples of the aromatic mineral oil include Diana Process Oils AC-12, AC460, AH-16, and AH-24 manufactured by Idemitsu Kosan Co., Ltd.

The synthetic oil is not particularly limited. Examples of the synthetic oil include chemical synthetic oils such as a poly-α-olefin and a polyol ester.

Examples of the vegetable oil include castor oil, soybean oil, rapeseed oil, corn oil, safflower oil, rice oil, cottonseed oil, sesame oil, peanut oil, olive oil, and palm oil.

The surface treated calcium carbonate is impregnated with the organic compound in a liquid state at a normal temperature in an amount of about 3 parts by weight to 22 parts by weight with respect to 100 parts by weight of the surface treated calcium carbonate. The impregnation amount of the organic compound in a liquid state at a normal temperature is preferably about 5 parts by weight to 20 parts by weight and more preferably about 5 parts by weight to 15 parts by weight with respect to 100 parts by weight of the surface treated calcium carbonate. In other words, the organic compound in a liquid state at a normal temperature adheres to the surface treated calcium carbonate typically in an amount of about 3 parts by weight to 22 parts by weight, preferably about 5 parts by weight to 20 parts by weight, and more preferably 5 parts by weight to 15 parts by weight, with respect to 100 parts by weight of the surface treated calcium carbonate.

When the surface treated calcium carbonate is impregnated with the organic compound in a liquid state at a normal temperature in an excessively small amount, the surface treated calcium carbonate readily flies and the dispersibility in a polymer composition is not improved. When impregnated with the organic compound in a liquid state at a normal temperature in an excessively large amount, the surface treated calcium carbonate has poor dispersibility in a polymer composition.

The impregnation amount of the organic compound in a liquid state at a normal temperature is not affected by the average particle size, the BET specific surface area, the fatty-acid surface-treatment amount, and the like of the surface treated calcium carbonate.

As described above, the impregnated calcium carbonate is obtained by surface treating calcium carbonate with at least one of a fatty acid, a resin acid, and derivatives of them to yield a surface treated calcium carbonate and impregnating the surface treated calcium carbonate with an organic compound in a liquid state at a normal temperature. In other words, a method for producing the impregnated calcium carbonate includes a surface treatment process of surface treating calcium carbonate with at least one of a fatty acid, a resin acid, and derivatives of them to yield a surface treated calcium carbonate and an impregnation process of impregnating the surface treated calcium carbonate with an organic compound in a liquid state at a normal temperature in an amount of 3 to 22 parts by weight with respect to 100 parts by weight of the surface treated calcium carbonate.

(Surface Treatment)

The method for surface treating calcium carbonate with at least one of a fatty acid, a resin acid, and derivatives of them is not particularly limited.

The surface treatment may employ, for example, a method of adding at least one of a fatty acid, a resin acid, and derivatives of them to a slurry containing calcium carbonate and water and then dehydrating and drying the mixture. Examples of the method of surface treating calcium carbonate with an alkali metal salt of a fatty acid specifically include the method below.

A fatty acid is saponified while being heated in an aqueous alkali metal solution such as an aqueous NaOH solution and an aqueous KOH solution to give an aqueous solution of an alkali metal salt of the fatty acid. Next, the aqueous solution of an alkali metal salt of the fatty acid is added to a slurry of calcium carbonate and water and the whole is stirred. Consequently, the surface of the calcium carbonate can be surface-treated with the fatty acid.

The solid content of the calcium carbonate in the slurry of calcium carbonate and water can be appropriately adjusted in consideration of an average particle size of the calcium carbonate, a dispersibility of the calcium carbonate in the slurry, the readiness of slurry dehydration, and the like. The solid content of the slurry is adjusted to be typically about 2 to 30% by weight and preferably about 5 to 20% by weight, and this can give a slurry having an appropriate viscosity.

The slurry may be dehydrated by, for example, filter press. The slurry may be dried, for example, in a box dryer.

Alternatively, the fatty acid is not saponified to prepare a metal salt of the fatty acid, but the fatty acid may be used to treat the surface of calcium carbonate. For example, calcium carbonate is stirred while being heated at a temperature not lower than the melting point of a fatty acid, and the fatty acid is added to the calcium carbonate. Consequently, the surface of the calcium carbonate can be treated with the fatty acid. In a similar manner, calcium carbonate is stirred while being heated at a temperature not lower than the melting point of a fatty acid ester, and the fatty acid ester is added to the calcium carbonate. Consequently, the surface of the calcium carbonate can be treated with the fatty acid ester.

The surface treated calcium carbonate typically has a BET specific surface area of about $10\ m^2/g$ to $100\ m^2/g$, preferably about $10\ m^2/g$ to $60\ m^2/g$, and more preferably about $15\ m^2/g$ to $40\ m^2/g$.

The surface treated calcium carbonate typically has an average particle size of about 20 nm to 200 nm, preferably about 20 nm to 150 nm, and more preferably about 30 nm to 100 nm. In the present invention, the average particle size of a surface treated calcium carbonate is determined by image analysis under a transmission electron microscope.

(Impregnation Treatment)

The method for impregnating the surface treated calcium carbonate with an organic compound in a liquid state at a normal temperature is not particularly limited. For example, the surface treated calcium carbonate can be mixed with an organic compound in a liquid state at a normal temperature to afford an impregnated calcium carbonate. Specific examples of the impregnation treatment include a method of spraying an organic compound in a liquid state at a normal temperature to a dried, surface treated calcium carbonate and stirring the calcium carbonate with the organic compound. The stirring method is not particularly limited, and the stirring is performed with, for example, a mixer or a super mixer.

The temperature during mixing the surface treated calcium carbonate with the organic compound in a liquid state at a normal temperature is not particularly limited. For example, the mixing may be performed at a room temperature (25° C.). The mixing time is typically about 0.1 second to 10 minutes.

(Polymer Composition)

The polymer composition includes a polymer and the impregnated calcium carbonate. Examples of the polymer composition include a resin composition and a rubber composition. The polymer included in the polymer composition is not particularly limited. Examples of the polymer include a resin and a rubber.

[Resin Composition]

The resin included in the resin composition is not particularly limited. Examples of the resin include known resins such as a polyvinyl chloride resin, a polyurethane resin, a modified silicone resin, a polysulfide resin, an acrylic resin, a silicone resin, and polypropylene glycols.

The resin composition may further contain a resin plasticizer, a filler, a crosslinking agent, and other additive, as necessary. Each of the resin plasticizer, the filler, the crosslinking agent, and other additives may be composed of a single component or a plurality of components.

Examples of the resin plasticizer include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), ditridecyl phthalate (DTDP), butyl benzyl phthalate (BBP), dicyclohexyl phthalate (DCHP), a tetrahydrophthalate, dioctyl adipate (DOA), diisononyl adipate (DINA), diisodecyl adipate (DIDA), di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tri (chloroethyl) phosphate (TCEP), trisdichloropropyl phosphate (CRP), tributoxyethyl phosphate (TBXP), tris(β-chloropropyl) phosphate (TMCPP), triphenyl phosphate (TPP), octyl diphenyl phosphate (CDP), acetyl triethyl citrate, tributyl acetylcitrate, a trimellitate plasticizer, a polyester plasticizer, a chlorinated paraffin, a stearate plasticizer, and dimethyl polysiloxane.

Examples of the filler (including thickeners) include an inorganic filler and an organic filler. Examples of the inorganic filler include calcium carbonates (natural products, synthesis products) except the calcium carbonate used in the impregnated calcium carbonate of the present invention, calcium-magnesium carbonate (natural products, synthesis products), basic magnesium carbonate, quartz powder, silica powder, finely-divided silica (dry-process product, wet-process product, gel-process product), finely-divided calcium silicate, finely-divided aluminum silicate, kaolin clay, pyrophyllite clay, talc, sericite, mica, bentonite, nepheline-syenite, aluminum hydroxide, magnesium hydroxide, barium sulfate, carbon black (furnace, thermal, acetylene), graphite, sepiolite, wollastonite, xonotlite, potassium titanate, carbon fibers, mineral fibers, glass fibers, Shirasu balloons, fly ash balloons, glass balloons, silica beads, alumina beads, and glass beads. Examples of the organic filler include wood powder, walnut powder, cork powder, wheat flour, starch, ebonite powder, rubber powder, powdery or bead-like fillers made of lignin, a phenol resin, a high-styrene resin, a polyethylene resin, a silicon resin, a urea resin, and other organic materials, cellulose powder, pulp powder, synthetic fiber powder, amide wax, and castor oil wax.

The resin composition can be obtained by mixing a resin and the impregnated calcium carbonate, as necessary, with a resin plasticizer, a filler, a crosslinking agent, and other additives. Examples of the method for mixing a resin with the impregnated calcium carbonate include a method of mixing with a universal mixer.

[Rubber Composition]

The rubber included in the rubber composition is not particularly limited. Examples of the rubber include a natural rubber and a synthetic rubber.

The natural rubber is a rubbery polymer obtained from natural plants. The natural rubber may have any shape, color tone, and the like, as long as having a cis-1,4-polyisoprene structure.

Examples of the synthetic rubber include isoprene rubber, styrene-butadiene rubber, butadiene rubber, chloroprene rubber, acrylonitrile-butadiene rubber, butyl rubber, halogenated butyl rubber, ethylene-propylene rubber, urethane rubber, silicone rubber, fluororubber, chlorosulfonated polyethylene, epichlorohydrin rubber, and polysulfide rubber. The rubber may be a latex mainly containing rubber.

The rubber composition may contain commonly used various compounding agents for rubber. Examples of the compounding agent for rubber include fillers such as carbon black, silica, clay, and other calcium carbonates; additives such as a silane coupling agent, a vulcanization acceleration aid, an activator, an oil, zinc flower, stearic acid, a softener, an age inhibitor, and a retarder; and vulcanizing agents such as a sulfur vulcanization accelerator.

Examples of the vulcanization accelerator include thiazole vulcanization accelerators such as di-2-benzothiazolyl disulfide (DM) and 2-mercaptobenzothiazole (M); sulfenamide vulcanization accelerators such as N-cyclohexyl-2-benzothiazolyl sulfenamide (CZ), N-tert-butyl-2-benzothiazolyl sulfenamide (NS), and N,N-dicyclohexyl-2-benzothiazole sulfenamide (DZ); thiuram vulcanization accelerators such as tetramethylthiuram monosulfide (TS) and tetramethylthiuram disulfide (TT); thiocarbamic acid vulcanization accelerators such as zinc dimethylthiocarbamate (PZ); and xanthogenate vulcanization accelerators such as zinc isopropylxanthogenate (ZIX).

The rubber composition can be produced by mixing a rubber and the impregnated calcium carbonate. Examples of the method for mixing a rubber and the impregnated calcium carbonate include a method of mixing the impregnated calcium carbonate while the rubber is kneaded with a closed kneader such as a Banbury mixer, a pressure kneader, and an intermix or an open roll mill.

The polymer composition contains the impregnated calcium carbonate typically in an amount of about 10 parts by weight to 400 parts by weight and preferably about 10 parts by weight to 300 parts by weight with respect to 100 parts by weight of the polymer composition.

(Polymer Precursor Composition)

The polymer precursor composition includes a polymer precursor and the impregnated calcium carbonate. Examples of the polymer precursor composition include a composition containing a precursor of the resin and a composition containing a precursor of the rubber. The polymer precursor composition may further contain a resin plasticizer, a filler, a crosslinking agent, other additives, various compounding agents for rubber, and other agents similar to those in the above, as necessary. The polymer precursor composition contains the impregnated calcium carbonate typically in an amount of about 10 parts by weight to 400 parts by weight and preferably about 10 parts by weight to 300 parts by weight with respect to 100 parts by weight of the polymer precursor composition.

The impregnated calcium carbonate of the present invention has excellent dispersibility in a polymer composition and a polymer precursor composition and thus can be suitably used as a compounding agent for an ink, a paint, a sealing material, a PVC sol, an acrylic sol, a resin, a rubber, and the like. The resin composition and the resin precursor composition of the present invention uniformly disperse the impregnated calcium carbonate and thus can be suitably used as a sealant, a PVC sol, an acrylic sol, an adhesive, and the like. The rubber composition and the rubber precursor composition of the present invention uniformly disperse the impregnated calcium carbonate and thus can be suitably used as a rubber vibration isolator, a packing, a weatherstrip, a hose, a gasket, an O-ring, and the like.

Meanwhile, in order to improve the properties such as the strength of a polymer composition of, for example, a resin and a rubber, a fine calcium carbonate, for example, having a BET specific surface area of about 10 to 40 $m^2/g$ and an average particle size of about several tens of nanometers to several hundreds of nanometers has been added.

However, such a calcium carbonate having a small particle size easily flies and is difficult to be handled. Hence, the handling of such a fine calcium carbonate requires any measure.

The impregnated calcium carbonate of the present invention is impregnated with an organic compound in a liquid state at a normal temperature in an amount of 3 to 22 parts by weight with respect to 100 parts by weight of the surface treated calcium carbonate. On this account, the surface treated calcium carbonate hardly flies and is easily handled even having a very small average particle size of, for example, about 20 nm to 200 nm.

In addition, the impregnated calcium carbonate of the present invention surprisingly has extremely excellent dispersibility in a polymer composition of, for example, a resin and a rubber and a polymer precursor composition. In particular, when the impregnated calcium carbonate of the present invention is mixed with a polymer such as a resin and a rubber or a precursor of such a polymer, the mixture becomes homogeneous in a very short time. In addition, the impregnated calcium carbonate of the present invention is uniformly dispersed in a very short time when being mixed with a resin plasticizer or the like. Thus, the impregnated calcium carbonate of the present invention can be readily mixed with a polymer or a polymer precursor to afford a polymer composition or a polymer precursor composition.

The polymer composition of the present invention uniformly disperses the impregnated calcium carbonate. Thus, the polymer composition of the present invention can be suitably used in various applications.

In a similar manner to the impregnated calcium carbonate in the present invention, inorganic particles such as calcium oxide particles and calcium hydroxide particles may be impregnated with the organic compound in a liquid state at a normal temperature to afford impregnated inorganic particles. Such impregnated inorganic particles also have excellent dispersibility in a polymer composition and a polymer precursor composition. In addition, the impregnated inorganic particles hardly fly and are easily handled even having a very small average particle size of, for example, about 20 nm to 200 nm.

The present invention will be described with reference to specific examples hereinbelow. The present invention is not limited to the specific examples below.

Example 1

To 2 kg of synthetic calcium carbonate having a BET specific surface area of 20 $m^2/g$, warm water was added so as to give a solid content of 10% by weight, and a calcium carbonate slurry liquid was prepared with a stirring disperser. To the slurry liquid under stirring with the disperser, 60 g of sodium stearate was added, and the whole was further stirred for 5 minutes. Next, the obtained slurry was dehydrated with a filter press, then dried in a box dryer, and pulverized to yield about 2 kg of surface treated calcium carbonate having a surface treated with sodium stearate.

Next, 200 g of the obtained surface treated calcium carbonate was charged in a mixer (fluidizing mixer SMP-2 manufactured by KAWATA MFG. Co., Ltd.) and stirred. Then, into the mixer, 10 g of Diana Process Oil NP-24 (trade name), a naphthene mineral oil, manufactured by Idemitsu Kosan Co., Ltd. was sprayed and the whole was stirred to yield an impregnated calcium carbonate. The treatment amount of Diana Process Oil NP-24 was adjusted so as to be 5 parts by weight with respect to 100 parts by weight of the surface treated calcium carbonate.

Next, the dustability (degree of dispersion) of the impregnated calcium carbonate obtained in Example 1 was evaluated as below.

[Dustability Evaluation]

Model PT-D powder tester manufactured by Hosokawa Micron Corporation was used for the dustability evaluation. As shown in FIG. 1, with a powder tester 1, a round watch glass 4 (a radius of 5 cm) was placed under a glass cylinder 2 (a radius of 5 cm, a length of 35 cm), and 10 g of sample 5 (impregnated calcium carbonate) was dropped under gravity from a round sample plate 3 (a radius of 2.5 cm). The distance from the bottom of the sample plate 3 to the top of the glass cylinder was 16 cm, and the distance from the bottom of the glass cylinder 2 to the watch glass 4 was 11 cm. The dustability (degree of dispersion) was evaluated from a value calculated in accordance with the equation below. Table 1 shows the result.

Dustability(degree of dispersion)=(1−(sample amount on watch glass/sample amount dropped from sample plate))×100

In accordance with the evaluation method, the dustability, that is, the flying degree of an impregnated calcium carbonate was represented by a numerical value. A sample powder having a larger numerical value readily flies.

[Preparation of Resin Paste]

Next, in accordance with the formulation shown in Table 2, 150 parts by weight of polyvinyl chloride (PVC paste resin ZEST P21 manufactured by Dai-Ichi Vinyl Corporation) as a resin, 95 parts by weight of diisononyl phthalate (phthalate ester SANSO CIZER DINP manufactured by New Japan Chemical Co., Ltd.) as a resin plasticizer, and 75 parts by weight of heavy calcium carbonate (heavy calcium carbonate BF300 manufactured by BIHOKU FUNKA KOGYO CO., LTD.) as a filler were charged into a kneader, and the whole was mixed to yield a resin paste. To the obtained resin paste, 105 parts by weight of the impregnated calcium carbonate was added, and the mixture was further kneaded. The dispersibility of the impregnated calcium carbonate in the resin paste was evaluated as below.

[Dispersibility Evaluation]

Figure 2:
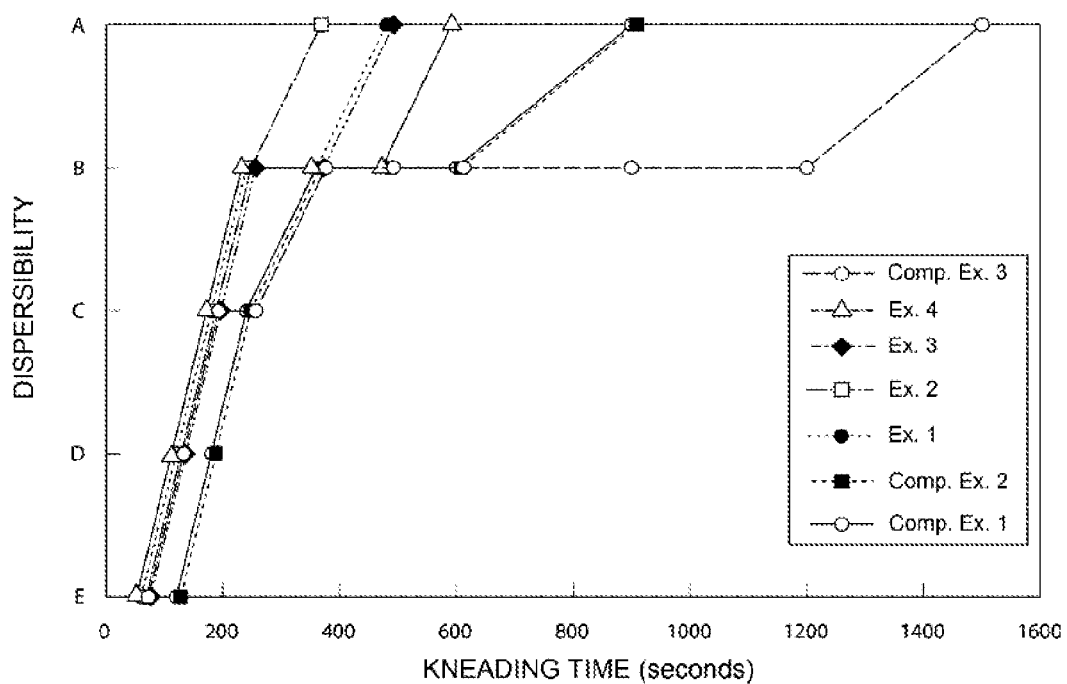
FIG. 2 is a graph showing the relation between dispersibility and kneading time in Examples 1 to 4 and Comparative Examples 1 to 3.
Figure 3:
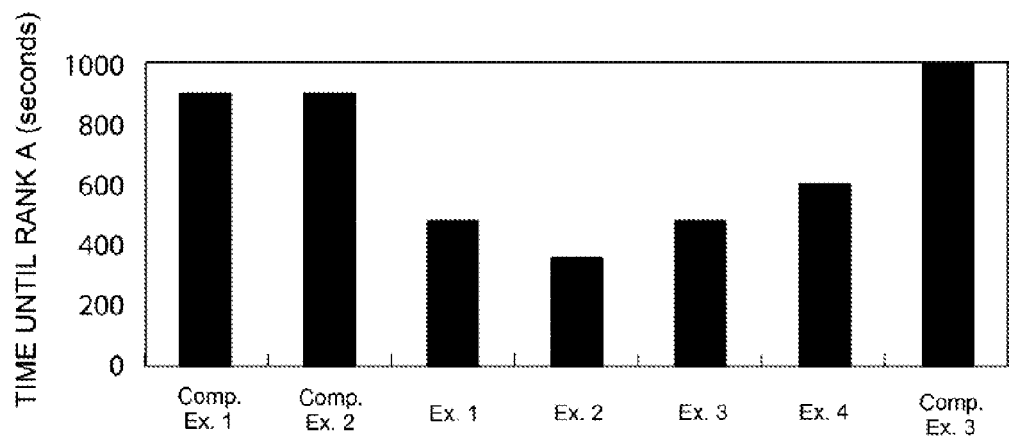
FIG. 3 is a graph showing the time until dispersion reaches rank A in Examples 1 to 4 and Comparative Examples 1 to 3.

During kneading of the resin paste and the impregnated calcium carbonate, a sample was collected at predetermined intervals. An adequate amount of the collected sample was placed on black paper and was applied with a 500-μm applicator. In accordance with the evaluation standard for dispersibility in Table 3, the dispersibility was evaluated into five ranks of A to E based on the number and size of particles present in the coating of the sample applied. Table 4 shows the results. FIG. 2 shows the graph representing the relation between dispersibility and kneading time. FIG. 3 shows the graph representing the time until the dispersion reaches rank A.

Example 2

An impregnated calcium carbonate was obtained in a similar manner to that in Example 1 except that the amount of Diana Process Oil NP-24 (trade name) was 10 parts by weight with respect to 100 parts by weight of the surface treated calcium carbonate. Next, the dustability (degree of dispersion) of the impregnated calcium carbonate obtained in Example 2 was evaluated in a similar manner to that in Example 1. Table 1 shows the result. Next, in a similar manner to that in Example 1, the impregnated calcium carbonate obtained in Example 2 was mixed with a resin to prepare a resin paste, and the dispersibility of the impregnated calcium carbonate in the obtained resin paste was evaluated. Table 2 shows the ratio of the combination amount of each ingredient contained in the resin paste to which the impregnated calcium carbonate was added. Table 4, FIG. 2, and FIG. 3 show the evaluation result of the dispersibility.

Example 3

An impregnated calcium carbonate was obtained in a similar manner to that in Example 1 except that the amount of Diana Process Oil NP-24 (trade name) was 14 parts by weight with respect to 100 parts by weight of the surface treated calcium carbonate. Next, the dustability (degree of dispersion) of the impregnated calcium carbonate obtained in Example 3 was evaluated in a similar manner to that in Example 1. Table 1 shows the result. Next, in a similar manner to that in Example 1, the impregnated calcium carbonate obtained in Example 3 was mixed with a resin to prepare a resin paste, and the dispersibility of the impregnated calcium carbonate in the resin paste was evaluated. Table 2 shows the ratio of the combination amount of each ingredient contained in the resin paste to which the impregnated calcium carbonate was added. Table 4, FIG. 2, and FIG. 3 show the evaluation result of the dispersibility.

Example 4

An impregnated calcium carbonate was obtained in a similar manner to that in Example 1 except that the amount of Diana Process Oil NP-24 (trade name) was 20 parts by weight with respect to 100 parts by weight of the surface treated calcium carbonate. Next, the dustability (degree of dispersion) of the impregnated calcium carbonate obtained in Example 4 was evaluated in a similar manner to that in Example 1. Table 1 shows the result. Next, in a similar manner to that in Example 1, the impregnated calcium carbonate obtained in Example 4 was mixed with a resin to prepare a resin paste, and the dispersibility of the impregnated calcium carbonate in the resin paste was evaluated. Table 2 shows the ratio of the combination amount of each ingredient contained in the resin paste to which the impregnated calcium carbonate was added. Table 4, FIG. 2, and FIG. 3 show the evaluation result of the dispersibility.

Comparative Example 1

A surface treated calcium carbonate having a surface treated with sodium stearate was obtained in a similar manner to that in Example 1. Next, the surface treated calcium carbonate having the surface treated with sodium stearate obtained in Comparative Example 1 was not subjected to the impregnation treatment and the dustability (degree of dispersion) of the surface treated calcium carbonate was evaluated in a similar manner to that in Example 1. Table 1 shows the result.

Next, a resin paste was prepared in a similar manner to that in Example 1. To the resin paste, Diana Process Oil NP-24 (trade name) was added, and the whole was stirred to yield a resin paste. The amount of Diana Process Oil NP-24 (trade name) was 10 parts by weight with respect to 100 parts by weight of the surface treated calcium carbonate to be added to the resin. To the obtained resin paste, the surface treated calcium carbonate obtained in Comparative Example 1 was added, and the dispersibility of the surface treated calcium carbonate in the resin paste was evaluated in a similar manner to that in Example 1. Table 2 shows the ratio of the combination amount of each ingredient contained in the resin paste to which the surface treated calcium carbonate was added. Table 4, FIG. 2, and FIG. 3 show the evaluation result of the dispersibility.

Comparative Example 2

An impregnated calcium carbonate was obtained in a similar manner to that in Example 1 except that the amount of Diana Process Oil NP-24 (trade name) was 2 parts by weight with respect to 100 parts by weight of the surface treated calcium carbonate. Next, the dustability (degree of dispersion) of the impregnated calcium carbonate obtained in Comparative Example 2 was evaluated in a similar manner to that in Example 1. Table 1 shows the result. Next, in a similar manner to that in Example 1, the impregnated calcium carbonate obtained in Comparative Example 2 was mixed with a resin to prepare a resin paste, and the dispersibility of the impregnated calcium carbonate was evaluated. Table 2 shows the ratio of the combination amount of each ingredient contained in the resin paste to which the impregnated calcium carbonate was added. Table 4, FIG. 2, and FIG. 3 show the evaluation result of the dispersibility.

Comparative Example 3

An impregnated calcium carbonate was obtained in a similar manner to that in Example 1 except that the amount of Diana Process Oil NP-24 (trade name) was 25 parts by weight with respect to 100 parts by weight of the surface treated calcium carbonate. Next, the dustability (degree of dispersion) of the impregnated calcium carbonate obtained in Comparative Example 3 was evaluated in a similar manner to that in Example 1. Table 1 shows the result. In a similar manner to that in Example 1, the impregnated calcium carbonate obtained in Comparative Example 3 was mixed with a resin to prepare a resin paste, and the dispersibility of the impregnated calcium carbonate in the resin paste was evaluated. Table 2 shows the ratio of the combination amount of each ingredient contained in the resin paste to which the impregnated calcium carbonate was added. Table 4, FIG. 2, and FIG. 3 show the evaluation result of the dispersibility.

TABLE 1

|  | Dustability Evaluation (degree of dispersion) |
|---|---|
| Ex. 1 | 9% |
| Ex. 2 | 8% |
| Ex. 3 | 6% |
| Ex. 4 | 5% |
| Comp. Ex. 1 | 22% |
| Comp. Ex. 2 | 18% |
| Comp. Ex. 3 | 5% |

TABLE 2

| | \[Ratio of Combination Amount of Each Ingredient\] | | | | |
|---|---|---|---|---|---|
| | Resin Polyvinyl Chloride (parts by weight) | Resin Plasticizer Diisononyl Phthalate (parts by weight) | Mineral Oil NP-24 (parts by weight) | Filler Heavy Calcium Carbonate (parts by weight) | Impregnated Calcium Carbonate (parts by weight) |
| Ex. 1 | 150 | 95 | — | 75 | 105 |
| Ex. 2 | 150 | 90 | — | 75 | 110 |
| Ex. 3 | 150 | 86 | — | 75 | 114 |
| Ex. 4 | 150 | 80 | — | 75 | 120 |
| Comp. Ex. 1 | 150 | 90 | 10 | 75 | (100)*[1] |
| Comp. Ex. 2 | 150 | 98 | — | 75 | 102 |
| Comp. Ex. 3 | 150 | 75 | — | 75 | 125 |

*[1]In Comparative Example 1, the surface treated calcium carbonate was used in place of the impregnated calcium carbonate.

TABLE 3

| | \[Dustability Evaluation Standard\] | | |
|---|---|---|---|
| | Particle Size | | |
| | 0.3 mm to 1.0 mm | 1.0 mm or more | 1.5 mm or more |
| A | 1 or less | 0 | 0 |
| B | Less than 40 | 0 | 0 |
| C | 40 or more | Less than 10 | Less than 2 |
| D | 40 or more | Less than 20 | 3 or more |
| E | 40 or more | 20 or more | 3 or more |

TABLE 4

| | | Time (seconds) | | | | | | | | | | Time until Rank A |
|---|---|---|---|---|---|---|---|---|---|---|---|---|
| | | 60 | 120 | 180 | 240 | 360 | 480 | 600 | 900 | 1200 | 1500 | (seconds) |
| Ex. 1 (5 parts by weight) | Dispersibility Evaluation (A to E) | E | D | C | B | B | A | | | | | 480 |
| Ex. 2 (10 parts by weight) | | E | D | C | B | A | | | | | | 360 |
| Ex. 3 (14 parts by weight) | | E | D | C | B | B | A | | | | | 480 |
| Ex. 4 (20 parts by weight) | | E | E | C | B | B | B | A | | | | 600 |
| Comp. Ex. 1 (10 parts by weight) | | E | E | D | C | B | B | B | A | | | 900 |
| Comp. Ex. 2 (2 parts by weight) | | E | E | D | C | B | B | B | A | | | 900 |
| Comp. Ex. 3 (25 parts by weight) | | E | D | C | C | B | B | B | B | B | A | 1500 |

Each resin composition of Example 2 and Comparative Example 1 was obtained by using Diana Process Oil NP-24 (trade name) in an amount of 10 parts by weight with respect to 100 parts by weight of the surface treated calcium carbonate. As apparent from the results shown in FIG. 2 and FIG. 3, Example 2 in which the surface treated calcium carbonate treated with a fatty acid was previously impregnated with Diana Process Oil NP-24 had a short time of 360 seconds until the impregnated calcium carbonate was homogeneously dispersed in the resin (time until rank A). In contrast, Comparative Example 1 in which a resin was mixed with Diana Process Oil NP-24 and then the surface treated calcium carbonate was added had a long time of 900 seconds until homogeneous dispersion. The result reveals the followings: the simple addition of the organic compound in a liquid state at a normal temperature to a resin fails to improve the dispersibility of the surface treated calcium carbonate, but excellent dispersibility is achieved by impregnating the surface treated calcium carbonate with the organic compound in a liquid state at a normal temperature and then adding the calcium carbonate to a resin. It is supposed that a surface treated calcium carbonate even having the surface treated with a fatty acid or the like but having a smaller particle size has a higher affinity among the surface treated calcium carbonate than the affinity to a resin, and the simple addition of the organic compound in a liquid state at room temperature fails to improve the dispersibility. In contrast, it is supposed that in the impregnated calcium carbonate of the present invention, the surface treated calcium carbonate particles are covered with the organic compound in a liquid state at a normal temperature, the organic compound in a liquid state at a normal temperature decreases the affinity among the surface treated calcium carbonate, and as a result, the impregnated calcium carbonate of the present invention has excellent dispersibility in a resin.

Comparative Example 3 in which Diana Process Oil NP-24 was used in a large amount of 25 parts by weight required a longer time of 1,500 seconds than that by Comparative Example 1 until the impregnated calcium carbonate was uniformly dispersed in the resin. The result reveals the followings: the impregnation with the organic compound in a liquid state at a normal temperature in a larger amount does not necessarily improve the dispersibility of the surface treated calcium carbonate in a resin, and it is important to design the impregnation amount of the organic compound in a liquid state at a normal temperature within a particular range. It is supposed that when the impregnation amount of the organic compound in a liquid state at a normal temperature is excess, the surface treated calcium carbonate is covered with a large amount of the organic compound in a liquid state at a normal temperature and this conversely prevents the dispersion in a resin or the like.

Example 5

Figure 4:
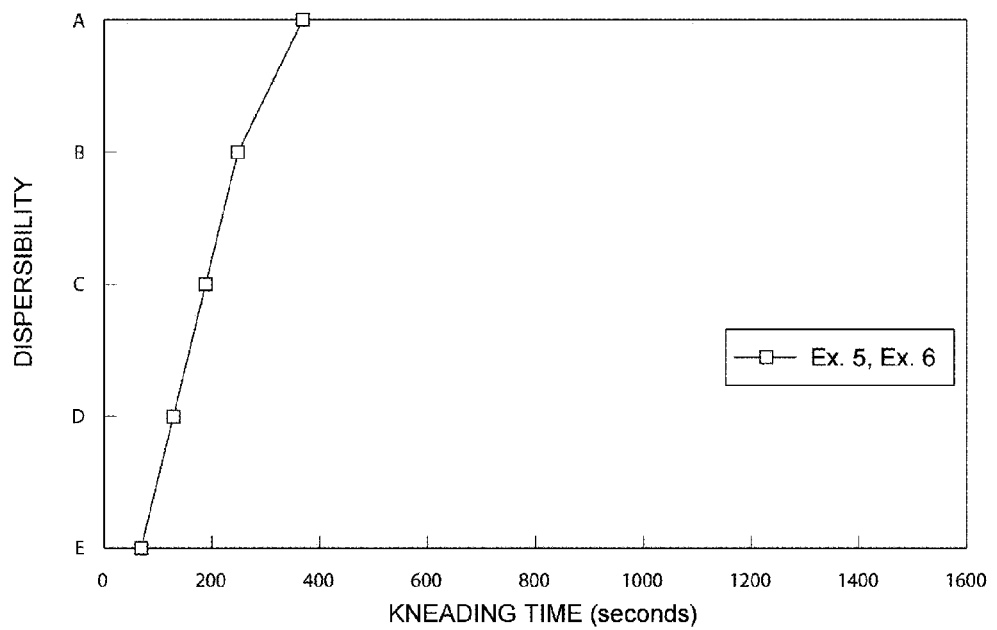
FIG. 4 is a graph showing the relation between dispersibility and kneading time in Example 5 and Example 6.
Figure 5:
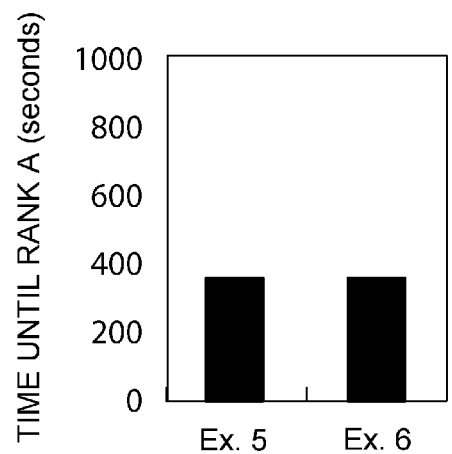
FIG. 5 is a graph showing the time until dispersion reaches rank A in Example 5 and Example 6.

An impregnated calcium carbonate was obtained in a similar manner to that in Example 2 except that diisononyl phthalate (DINP) was used in place of Diana Process Oil NP-24 (trade name). Next, the dustability (degree of dispersion) of the impregnated calcium carbonate obtained in Example 5 was evaluated in a similar manner to that in Example 1. Table 5 shows the result. Next, in a similar manner to that in Example 1, the impregnated calcium carbonate obtained in Example 5 was mixed with a resin to prepare a resin paste, and the dispersibility of the impregnated calcium carbonate in the resin paste was evaluated. Table 6 shows the ratio of the combination amount of each ingredient contained in the resin paste to which the impregnated calcium carbonate was added. Table 7, FIG. 4, and FIG. 5 show the evaluation result of the dispersibility.

Example 6

An impregnated calcium carbonate was obtained in a similar manner to that in Example 2 except that polypropylene glycol (UNIOL D-250 manufactured by NOF CORPORATION) was used in place of Diana Process Oil NP-24 (trade name). Next, the dustability (degree of dispersion) of the impregnated calcium carbonate obtained in Example 6 was evaluated in a similar manner to that in Example 1. Table 5 shows the result. Next, in a similar manner to that in Example 1, the impregnated calcium carbonate obtained in Example 6 was mixed with a resin to prepare a resin paste, and the dispersibility of the impregnated calcium carbonate in the resin paste was evaluated. Table 6 shows the ratio of the combination amount of each ingredient contained in the resin paste to which the impregnated calcium carbonate was added. Table 7, FIG. 4, and FIG. 5 show the evaluation result of the dispersibility.

TABLE 5

| | Dustability Evaluation (degree of dispersion) |
|---|---|
| Ex. 5 | 7% |
| Ex. 6 | 7% |

TABLE 6

| | Resin | Plasticizer | Filler | Impregnated Calcium Carbonate (parts by weight) | |
|---|---|---|---|---|---|
| | Resin Polyvinyl Chloride (parts by weight) | Diisononyl Phthalate (parts by weight) | Heavy Calcium Carbonate (parts by weight) | Diisononyl Phthalate Treatment | Polypropylene Glycol Treatment |
| Ex. 5 | 150 | 90 | 75 | 110 | — |
| Ex. 6 | 150 | 90 | 75 | — | 110 |

TABLE 7

| | | Time (seconds) | | | | | | | | | Time until Rank A (seconds) |
|---|---|---|---|---|---|---|---|---|---|---|---|
| | | 60 | 120 | 180 | 240 | 360 | 480 | 600 | 900 | 1200 | 1500 | |
| Ex. 5 (10 parts by weight) | Dispersibility Evaluation (A to E) | E | D | C | B | A | | | | | | 360 |
| Ex. 6 (10 parts by weight) | | E | D | C | B | A | | | | | | 360 |

Example 7

Figure 6:
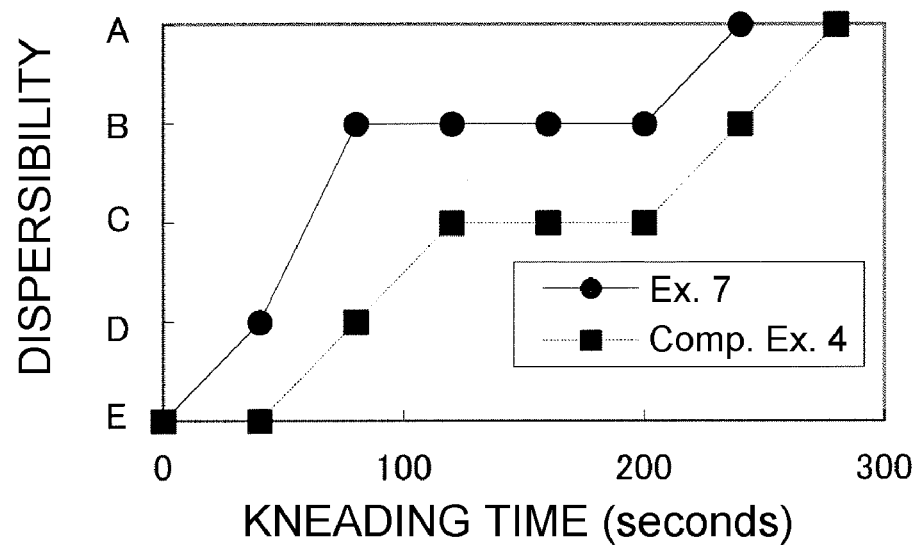
FIG. 6 is a graph showing the relation between dispersibility and kneading time in Example 7 and Comparative Example 4.

In accordance with the formulation shown in Table 8, 92 parts by weight of polypropylene glycol (EXCENOL 3020 manufactured by ASAHI GLASS CO., LTD.) as a resin precursor and 88 parts by weight of the impregnated calcium carbonate prepared in Example 6 were added and the mixture was kneaded to yield a paste. The obtained paste was subjected to the dispersibility evaluation in a similar manner to that in Example 1. Table 9 and FIG. 6 show the result.

Comparative Example 4

In accordance with the formulation shown in Table 8, 100 parts by weight of polypropylene glycol (EXCENOL 3020 manufactured by ASAHI GLASS CO., LTD.) as a resin precursor and 80 parts by weight of the surface treated calcium carbonate obtained in Comparative Example 1 were added and the mixture was kneaded to yield a paste. The obtained paste was subjected to the dispersibility evaluation in a similar manner to that in Example 1. Table 9 and FIG. 6 show the result.

Example 8

Figure 7:
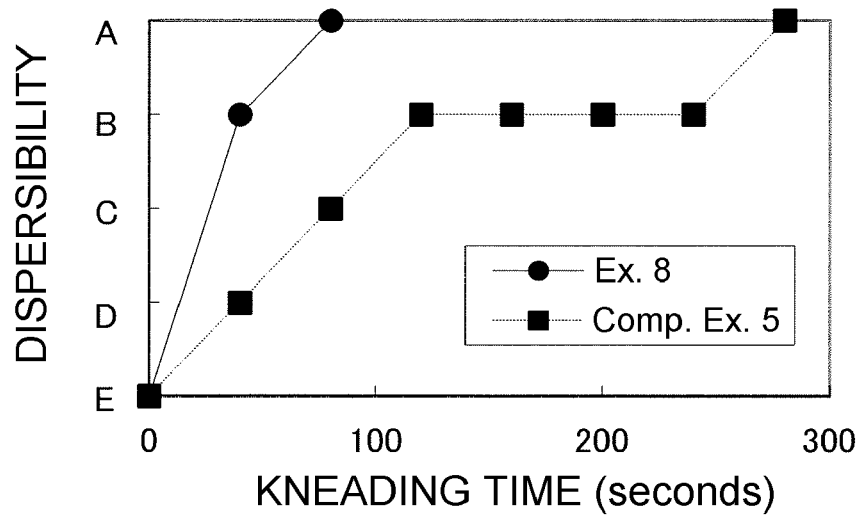
FIG. 7 is a graph showing the relation between dispersibility and kneading time in Example 8 and Comparative Example 5.

In accordance with the formulation shown in Table 8, 94 parts by weight of modified silicone polymer (MS Polymer 5203 manufactured by Kaneka Corporation) as a resin precursor and 66 parts by weight of the impregnated calcium carbonate prepared in Example 6 were added and the mixture was kneaded to yield a paste. The obtained paste was subjected to the dispersibility evaluation in a similar manner to that in Example 1. Table 9 and FIG. 7 show the result.

Comparative Example 5

In accordance with the formulation shown in Table 8, 100 parts by weight of modified silicone polymer (MS Polymer 5203 manufactured by Kaneka Corporation) as a resin precursor and 60 parts by weight of the surface treated calcium carbonate obtained in Comparative Example 1 were added and the mixture was kneaded to yield a paste. The obtained paste was subjected to the dispersibility evaluation in a similar manner to that in Example 1. Table 9 and FIG. 7 show the result.

Example 9

Figure 8:
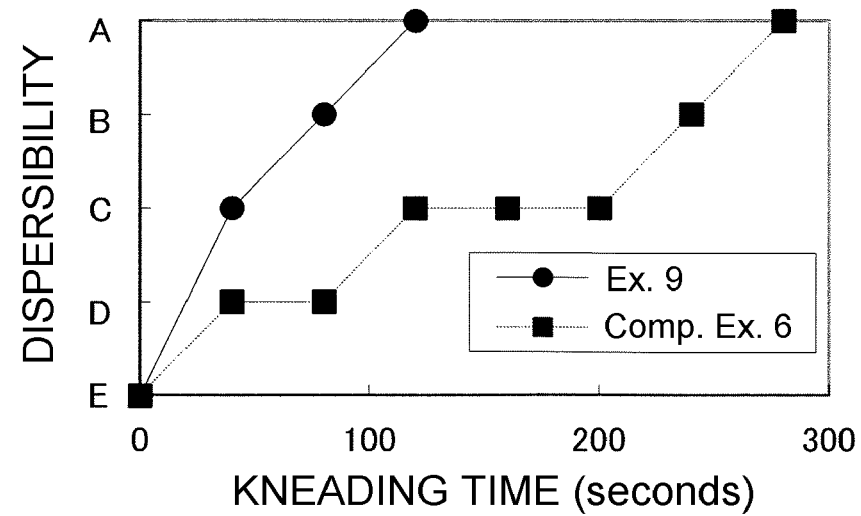
FIG. 8 is a graph showing the relation between dispersibility and kneading time in Example 9 and Comparative Example 6.

In accordance with the formulation shown in Table 8, 90 parts by weight of diisononyl phthalate (SANSO CIZER DINP manufactured by New Japan Chemical Co., Ltd.) as a resin precursor and 110 parts by weight of the impregnated calcium carbonate prepared in Example 6 were added and the mixture was kneaded to yield a paste. The obtained paste was subjected to the dispersibility evaluation in a similar manner to that in Example 1. Table 9 and FIG. 8 show the result.

Comparative Example 6

In accordance with the formulation shown in Table 8, 100 parts by weight of diisononyl phthalate (SANSO CIZER DINP manufactured by New Japan Chemical Co., Ltd.) as a resin precursor and 100 parts by weight of the surface treated calcium carbonate obtained in Comparative Example 1 were added and the mixture was kneaded to yield a paste. The obtained paste was subjected to the dispersibility evaluation in a similar manner to that in Example 1. Table 9 and FIG. 8 show the result.

TABLE 8

| | Resin Precursor | | | Impregnated | Surface Treated |
| | Polypropylene Glycol (parts by weight) | Modified Silicone Polymer (parts by weight) | Diisononyl Phthalate (parts by weight) | Calcium Carbonate (parts by weight) | Calcium Carbonate (parts by weight) |
|---|---|---|---|---|---|
| Ex. 7 | 92 | — | — | 88 | — |
| Comp. Ex. 4 | 100 | — | — | — | 80 |
| Ex. 8 | — | 94 | — | 66 | — |
| Comp. Ex. 5 | — | 100 | — | — | 60 |
| Ex. 9 | — | — | 90 | 110 | — |
| Comp. Ex. 6 | — | — | 100 | — | 100 |

TABLE 9

| | | Time (seconds) | | | | | | | | Time until Rank A |
| | | 0 | 40 | 80 | 120 | 160 | 200 | 240 | 280 | (seconds) |
|---|---|---|---|---|---|---|---|---|---|---|
| Ex. 7 | Dispersibility | E | D | B | B | B | B | A | | 240 |
| Comp. Ex. 4 | Evaluation (A to E) | E | E | D | C | C | C | B | A | 280 |
| Ex. 8 | | E | B | A | | | | | | 80 |
| Comp. Ex. 5 | | E | D | C | B | B | B | A | | 280 |
| Ex. 9 | | E | C | B | A | | | | | 120 |
| Comp. Ex. 6 | | E | D | D | C | C | C | B | A | 280 |

REFERENCE SIGNS LIST

1 Powder tester
2 Glass cylinder
3 Sample plate
4 Watch glass
5 Sample

What is claimed is:

1. An impregnated calcium carbonate comprising:
    a surface treated calcium carbonate with at least one of a fatty acid, a resin acid, and derivatives of them; and
    an organic compound in a liquid state at 1 atmosphere and 25° C. which the surface treated calcium carbonate is impregnated with in an amount of 3 to 22 parts by weight with respect to 100 parts by weight of the surface treated calcium carbonate,
    wherein the organic compound is at least one of a polyester plasticizer, a sulfonic acid plasticizer, a phosphoric acid plasticizer, a mineral oil, a synthetic oil and polypropylene glycols.

2. The impregnated calcium carbonate according to claim 1, wherein the calcium carbonate is a synthetic calcium carbonate.

3. The impregnated calcium carbonate according to claim 1, wherein the surface treated calcium carbonate has an average particle size of 20 nm to 200 nm.

4. The impregnated calcium carbonate according to claim 1, wherein the surface treated calcium carbonate has a BET specific surface area of 10 $m^2/g$ to 100 $m^2/g$.

5. The impregnated calcium carbonate according to claim 1, wherein the calcium carbonate is treated with the at least one of a fatty acid, a resin acid, and derivatives of them in an amount of 2 parts by weight to 15 parts by weight with respect to 100 parts by weight of the calcium carbonate.

6. A polymer composition comprising the impregnated calcium carbonate according to claim 1.

7. A polymer precursor composition comprising the impregnated calcium carbonate according to claim 1.

8. A method for producing the impregnated calcium carbonate according to claim 1, the method comprising:
    surface treating calcium carbonate with at least one of a fatty acid, a resin acid, and derivatives of them to yield a surface treated calcium carbonate; and
    impregnating the surface treated calcium carbonate with an organic compound in a liquid state at 1 atmosphere and 25° C. after the surface treating step, in an amount of 3 to 22 parts by weight with respect to 100 parts by weight of the surface treated calcium carbonate.

* * * * *